United States Patent [19]
Boecker et al.

[11] Patent Number: 5,195,025
[45] Date of Patent: Mar. 16, 1993

[54] SYSTEM AND METHOD FOR DYNAMIC CHANGE OF COMPUTER SYSTEM AND SUBSYSTEM TIME-OF-DAY CLOCKS

[75] Inventors: Mark S. Boecker; John J. Ganci, both of Plano, Tex.

[73] Assignee: Texas Instruments Incorporated, Dallas, Tex.

[21] Appl. No.: 659,589

[22] Filed: Feb. 21, 1991

[51] Int. Cl.⁵ .............................................. G06F 1/14
[52] U.S. Cl. ................................................. 364/145
[58] Field of Search .............. 364/DIG. 1, DIG. 2, 364/145; 395/550, 800, 700

[56] References Cited

U.S. PATENT DOCUMENTS 4,841,474  6/1989  Zandveld et al. ............... 364/145 X

FOREIGN PATENT DOCUMENTS

105376  6/1983  Japan ................................. 364/145

*Primary Examiner*—Robert L. Richardson
*Attorney, Agent, or Firm*—L. Joy Griebenow; Richard L. Donaldson; William E. Hiller

[57] ABSTRACT

A system and method for dynamically changing a computer's time-related control blocks to coincide with seasonal time-of-day changes is shown including a first module for synchronizing the time-related control blocks and a second module connected to said first module for monitoring transfer of control of the time-related conrol blocks between the computer and the first module. Another system and method for dynamically changing a central processing unit time-of-day clock, without interrupting applications executing concurrently and without incurring any system down time entails transferring control of a time-of-day interpreter employing an offset to a time changer module, modifying the offset by a predetermined value at a predetermined rate until the offset reaches its synchronization value, and returning control of the interpreter to the computer. Other devices, systems and methods are also disclosed.

15 Claims, 5 Drawing Sheets

SYSTEM AND METHOD FOR DYNAMIC CHANGE OF COMPUTER SYSTEM AND SUBSYSTEM TIME-OF-DAY CLOCKS (C) Copyright Texas Instruments Incorporated 1991. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to computer timing services, and more specifically to a system and method for dynamically changing computer system and subsystem time-of-day clock(s) to coincide with seasonal time-of-day changes.

2. Description of the Related Art

Today's successful businesses are becoming increasingly dependent on various computer applications for day-to-day operations. As a result, a business needs its computer system to maintain continuous application availability. Continuous operations are critical to a company's success in today's worldwide business environment, especially in some businesses such as those in manufacturing environments.

Unfortunately, certain seasonal time-of-day changes, such as those brought about by the switch to Daylight Savings Time from Standard Time and back again, have heretofore created system downtime, service disruption, and the attending customer impact, while the system and subsystem clocks were adjusted. It is not unheard of for a business to experience a 1-2 hour system downtime occurring twice annually due to this seasonal time-of-day change.

Until the present invention, businesses either could change the system and subsystem clocks by some mechanical adjustment, could shutdown the system/subsystem until the "wall" clock matched the system clock, or could choose not to do anything, which meant much of the year, their clocks were not operating synchronously. Most businesses cannot afford to do the latter, and have elected one of the former options.

Accordingly, improvements which overcome any or all of these problems are presently desirable.

SUMMARY OF THE INVENTION

In view of the above problems associated with the related art, it is an object of the present invention to provide a system and method for dynamically changing system or subsystem time-of-day clocks to coincide with seasonal time-of-day changes.

It is another object of the present invention to provide a system and method for dynamically changing mainframe central processing unit (CPU) time-of-day clocks, without interrupting applications concurrently running on a computer and without incurring any system down time.

These and other objects are accomplished in a preferred embodiment of the present invention by a system and method which interact with operating system and subsystem timer service(s) to gradually adjust software time-of-day clocks to comprehend seasonal time changes such as the one hour time change from Daylight Savings to Standard Time and again back to Daylight Savings Time. A preferred embodiment changes the operating system's interpretation of the time-of-day clock by gradually modifying the time services control blocks, also known as offsets, such that application programs executing in the system will always perceive ascending time-of-day values to internal requests for time of day.

Very briefly, the preferred embodiment of the present invention transfers control to a first module. This first module performs initialization and then invokes a first submodule to perform the necessary IMS initialization function. The first module then enters a loop where the gradual time change occurs. Each iteration of the loop results in the modification of the MVS time-related control blocks and an invocation of a second submodule for the modification of the IMS time-related storage. When the first module determines that the time has been changed by the required amount, it performs its termination function and invokes a third submodule to perform the necessary IMS termination function.

These and other features and advantages of the invention will be apparent to those skilled in the art from the following detailed description of a preferred embodiment, taken together with the accompanying drawings, in which:

BRIEF DESCRIPTION OF THE DRAWINGS

Corresponding numerals and symbols in the different figures refer to corresponding parts unless otherwise indicated.

DETAILED DESCRIPTION OF A PREFERRED EMBODIMENT

The preferred embodiment of the system and method of the present invention relates generally to IBM and IBM-compatible mainframe computer software/hardware architectures operating in MVS/ESA and XA environments. Such embodiment provides an inter-face with IBM and IBM-compatible software and hardware. The host hardware involves IBM and IBM-compatible 3084/3090 class CPUs. Furthermore, a variety of operating systems can be employed interchangeably for the host processor. As indicated above, the preferred operating system is Multiple Virtual Storage/Extended Architecture (MVS/XA) which is a multiple task, multiple user environment for execution on the newest of IBM's S/370 processors. The details of the operating system are described in MVS/XA OLTEP LOGIC, SY28-118 and MVS/XA Logic VOLUMES 1-17, published by International Business Systems Corporation. MVS, MVS/ESA, MVS/XA, and CVT (later discussed) are trademarks or registered trademarks of International Business Systems Corporation. While such host processors and operating systems are described in the preferred embodiment, those skilled in the art will recognize that the invention can be practiced on other mainframes, mini-computers, and even microprocessors, such as on personal computing (PC) workstations or laptops running DOS.

In a preferred embodiment, the system and method interacts with the MVS system and subsystem timer service to gradually adjust software time-of-day clocks to comprehend seasonal time changes such as the one hour time change from Daylight Savings to Standard time and again back to Daylight Savings time. This is accomplished such that application programs executing in the system will always perceive ascending time-of-day values to any internal requests for the time of day.

For example, according to a preferred embodiment, the system or method of the present invention changes the formula used to interpret or compute the time-of-day clock by either speeding up the offset five milliseconds for every ten milliseconds of wall clock time or slowing down the offset five milliseconds for every ten milliseconds of wall clock time.

The dynamic time change system and method of the present invention is an MVS-started system task that affects only the interpretation of the time-of-day clock and does not actually modify any hardware clocks. Such system and method changes the operating system's interpretation of the time-of-day clock by gradually modifying the time services control blocks (also known as the time zone offset, CVTTZ, and midnight timer queue element, MTQE), thereby allowing the change to be implemented while maintaining continuous computer operations and without any loss of time or customer impact. This gradual modification, in a preferred embodiment, occurs over a two-hour period for both speedup and slowdown, and works the same way for both. Of course, preference dictates the length of the period over which the modification occurs, and as such, the length of the period should in no way limit the scope of the invention.

During the change from Daylight Savings Time to Standard Time, the dynamic time change system and method of the present invention "slowed-down" CPU clocks to effectively lose an hour over a two-hour period. Likewise, when returning to Daylight Savings Time, the CPU clocks are "sped-up" to effectively gain an hour over a two-hour period.

For example, an official time change from Daylight Savings Time to Standard Time occurred at 0200 on Sunday, Oct. 28, 1990. As can be seen looking at FIG. 1, this means the official "wall" clock and all CPU clocks started out one hour apart at the beginning of a two hour period. At 1:00 a.m. according to the wall clock, a CVTTZ offset of 5 hours is effectively subtracted from the CPU/GMT clock, resulting in the TIME macro returning a value of 1:00 a.m. At 2:00 a.m., the wall clock is by whatever means set back to 1:00 a.m. At this point, as would be expected, the TIME macro returns the value of 2:00 a.m. because the CVTTZ offset is still five hours. However, at this point the present invention takes control. According to the preferred embodiment of the present invention, the offset used in the formula to interpret or compute the CPU time of day clock slows down five milliseconds for every ten milliseconds. If the example involved returning to Daylight Savings Time, the offset used in the formula speeds up five milliseconds for every ten milliseconds.

Figure 1:
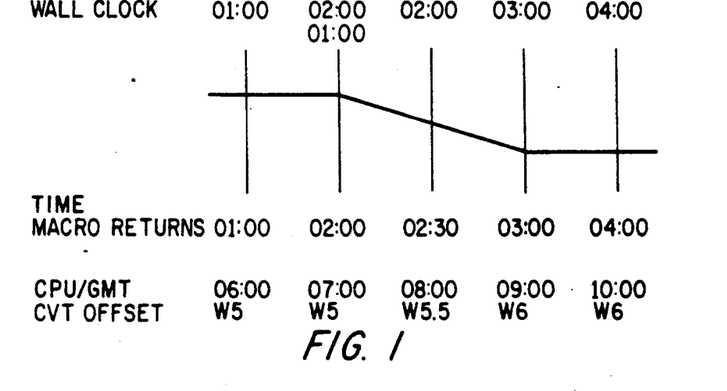
FIG. 1 is a time example of the dynamic time change expected when employing a preferred embodiment of the present invention.

Thus, when the wall clock reflects 2:00 a.m., the CVT Offset has increased to five and a half hours, resulting in the TIME macro returning a value of 2:30 a.m. The two clocks are now only half an hour apart. By the time the wall clock reaches 3:00 a.m., the CVTTZ offset has been changed to six hours. When this offset is applied to the CPU/GMT value of 9:00, the TIME macro returns the correct time of 3:00 a.m., and the two clocks continue to run synchronously, until the return to Daylight Savings Time in the spring requires the CVTTZ offset to be reduced to five hours again. For those skilled in the art, the CVTTZ offset of five hours is set according to the location of the computer using the offset, in the above case, within the Central Time Zone. The offset would change by one hour if the CPU time to be interpreted were, for example, within the Eastern Time Zone.

As seen with the above example, by gradually increasing the CVTTZ offset (or decreasing the offset, depending upon the seasonal change to be implemented) the time of day is interpreted as having been corrected without any interruption in operations or applications concurrently processing.

Figure 2A:
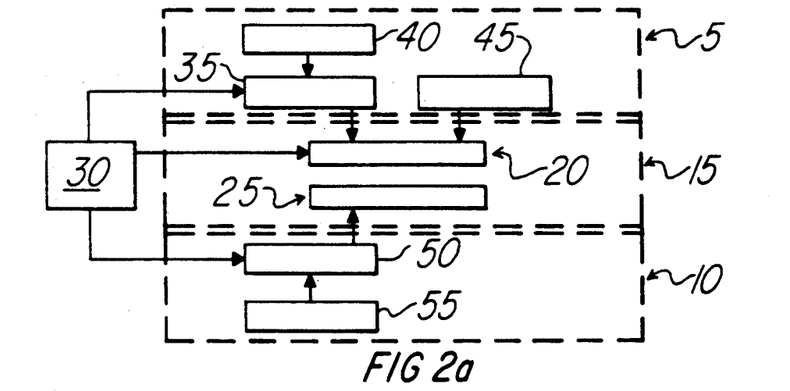
FIG. 2a is a block diagram depicting the system environment in which the present invention preferably operates.
Figure 2B:
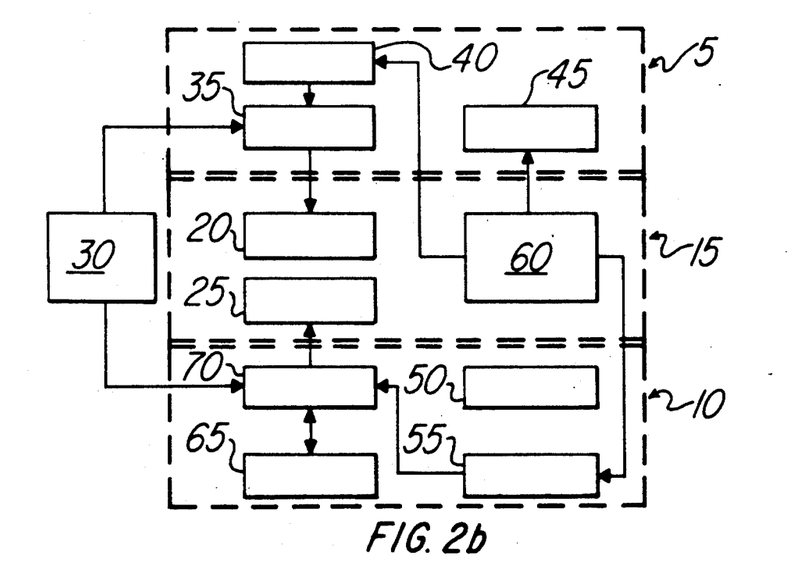
FIG. 2b is a block diagram depicting the system environment of FIG. 2a, with the addition of the present invention.

FIGS. 2a-b are block diagrams of the environment in which the present invention preferably operates. In order to better understand the present invention, FIG. 2a, depicting this environment for both MVS operating system 5 and IMS environment 10 without the present invention, will be considered first.

MVS operating system 5 provides a common set of services, such as the timer, for IMS 10 and other systems. GMT time-of-day clock 45 drives application requests for time. FIG. 2a shows two example applications, application 20 running in MVS and application 25 running in IMS, executing within work area 15.

To commence operation, an operator command starts the control program initialization procedures for MVS operating system 5, after which the operator enters the current time and date. MVS operating system 5 sets hardware time-of-day (TOD) clock 30 based on the local time zone offset from GMT clock 45, as defined in the system control program initialization parameters. For MVS operating system 5, this corresponds to the "CLOCKxx" member in SYS.PARMLIB.

Therefore, MVS operating system 5 initializes hardware TOD clock 30, MVS MTQE offset 40, and local time zone offset CVTTZ (from Greenwich Mean Time) 45. The values for these elements are determined as follows. TOD clock 30 makes available for access by applications 20, 25 the number of microseconds which have elapsed between 1/1/1900 0:00 GMT and the operator-entered current date/time. MVS offset 40 maintains the number of microseconds which have elapsed between 1/1/1900 0:00 GMT and midnight (local time). Local time zone offset 45 is set using a stored system parameter for local time.

IMS 10 initialization procedures perform the following steps to yield IMS offset field 55 values. First IMS 10 obtains clock time from TOD clock 30 and converts it to microseconds. Then IMS 10 obtains time from MVS operating system 5, in units of microseconds since last midnight. Next IMS 10 again obtains clock time from TOD clock 30, converting it to microseconds.

Lastly, IMS 10 averages the two clock times obtained from TOD clock 30, and subtracts that average from value obtained from MVS operating system 5 to thereby yield the value stored as IMS offset 55.

MVS operating system 5 provides time services to application 20 in one of two ways. The first way requires application 20 to obtain time from MVS time services block 35 which uses TOD clock 30 and MVS offset value 40 to return the time to application 20. The value returned by MVS time services 35 to application 20 equals the value obtained from TOD clock 30 plus twenty-four hours in TOD clock 30 units minus MVS offset value 40. Alternatively, application 20 obtains time directly from MVS operating system 5 by obtaining a value from TOD clock 30 directly, and adjusts this value using MVS offset value 40.

IMS 10, on the other hand, provides time services to application 25 by generating a time value based on summing the time (in microseconds) from TOD clock 30 with IMS offset 55.

As stated before, the objective of the present invention is to change the local CPU time-of-day for both MVS operating system 5 and IMS 10 so that once a computing system has completed its use of the present invention, both MVS operating system 5 and IMS system 10 are in synchronization with each other without incurring any CPU downtime and without disrupting any concurrently executing applications requiring ever-increasing time-of-day values.

The present invention is preferably started and stopped by an operator via an operator console or an automated operator command via an automation processor. Such startup command loads the main driver module (FALLBACK, described below). For ease of implementation of the present invention, all CPU hardware time-of-day clocks 30 are preferably set to GMT (Greenwich Mean Time). When GMT was implemented, time zone offset 45 was adjusted so that GMT plus a predetermined offset would equal the local time.

FIG. 2b depicts the same environment as FIG. 2a, with the addition of the present invention. When the dynamic time changer 60 (the preferred embodiment of the present invention) is activated, it preferably runs as a system task within work space 15. Dynamic time changer 60 alters the in-memory offsets for local time. In the preferred embodiment, every ten milliseconds, dynamic time changer 60 adjusts MVS offset 40 and IMS offset 55 by ±5 milliseconds, depending upon whether CPU clocks are to increase or decrease an hour. Additionally, every 2.08 seconds dynamic time changer 60 adjusts local time zone offset 45 by ±1, again depending upon whether the offset is to increase or decrease. These adjustments continue until MVS offset 40, local time zone offset 45, and IMS offset 55 have been adjusted by one hour.

It can be seen in FIG. 2b, that IMS time services block 50 is temporarily stored, and not affected by dynamic time changer 60 during the time adjustments. Instead temporary time services block 70 substitutes its services to the system for those of stored time services block 50, while the time adjustments are made, so concurrently executing application 25 will not be interrupted and will only see increasing time indicators.

This is achieved by storing the last time returned to IMS application 25 in last time storage 65. Dynamic time changer 60 initializes temporary time services block 70 which in turn retrieves the value stored in last time storage 65 to calculate the time to be returned to IMS application 25 based on the values obtained from IMS offset 55 as they are changed by dynamic time changer 60. Each time application 25 requests time from temporary time services block 70, time services block 70 determines such time value with the current IMS offset 55 together with TOD clock 30. The time value determined by time services block 70 is compared to the value stored in last time storage 65. If the new time value is greater than or equal to the value stored in last time storage 65, the new time value is stored in last time storage 65 and is also provided to application 25. If the new time value is less than that stored in last time storage 65, the value stored in last time storage 65 is returned to application 25. Then, when dynamic time changer 60 is finished, dynamic time changer 60 terminates temporary time services block 70 and restores time services block 50.

While only one TOD clock 30, one system time services 35, and one subsystem time services 50 is shown, there can be more than one of any of these elements in a computerized system. Therefore, it should be realized there could be a plurality of dynamic time changers 60 operating serially or in parallel on such elements, or one dynamic time changer which affects all of a plurality of TOD clocks and/or time services.

The preferred embodiment of the dynamic time change system and method of the present invention consists essentially of two load modules: FALLBACK and D22FTIM0. The FALLBACK module consists of one main module and five submodules: IMSESTAE, IMSID, IMSINIT, IMSPROC, and IMSTERM. The D22FTIM0 module consists of one main module. The present invention runs as an MVS started task. It must run MVS Authorized Program Facility (APF) authorized to change the system level control block.

It should be noted that the names selected to represent the various modules, submodules, files, parameters, and the like should not be considered in any way to limit the scope or intent of the present invention.

Figure 3A:
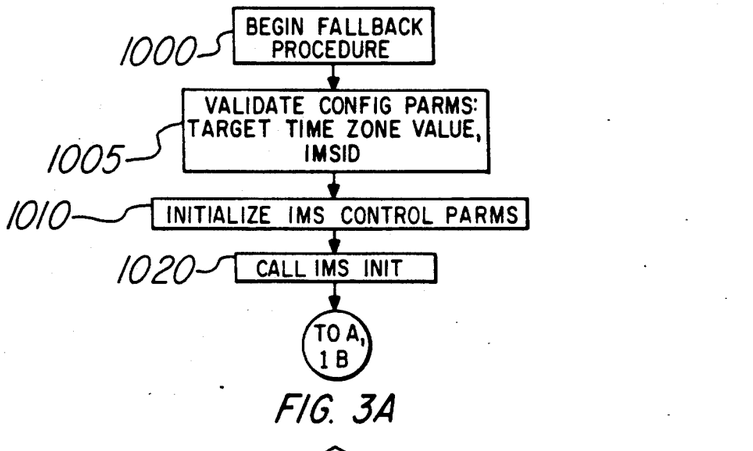
FIGS. 3a-d are process flow charts showing the system and method for dynamic time change according to a preferred embodiment of the present invention.

Looking now at FIG. 3a, the load module known as FALLBACK is depicted. As indicated above, FALLBACK is the main module of the present invention, is the first module to receive control during a dynamic time change, and is responsible for updating the MVS-related control blocks that provide time services to applications. FALLBACK validates the configuration parameters, target time zone and IMS system ID parameters (Block 1005), and initializes the IMS control parameters (Block, 1010). FALLBACK then invokes the IMSINIT submodule (Block 1020).

The IMSINIT submodule (FIG. 3c, Blocks 4000-4100) performs the necessary initialization for software that modifies the IMS time-related storage areas. IMSINIT first obtains the IMS System ID input parameter (IMSID) (Block 4000). The IMSID submodule is a data-only submodule containing the default logical name of the IMS subsystem whose time-related storage is being modified. Each IMS subsystem has a separate offset it uses for its internal software. This offset needs to be changed at the same time as the local time offset to the system Time of Day (TOD) clock. Second, IMSINIT locates the IMS system contents directory (SCD) that corresponds to the IMSID found. If the target IMSID has not been found (Block 4020), IMSINIT issues a warning diagnostic message saying the system does not host an IMS subsystem and IMSPROC will not need to update an IMS subsystem clock (Block 4030). IMSINIT then disables the processing to change the IMS clock (Block 4040) and returns to the FALLBACK module (FIG. 3B, Block 1030) to begin the dynamic clock change process to see if the target MVS Midnight Time Queue Element (MTQE) has been reached.

Returning to FIG. 3c, if the target IMSID has been found, IMSINIT loads the D22FTIM0 module into the MVS common storage area (CSA) (Block 4050). The D22FTIM0 module is a modified version of the IMS module DFSFTIM0. DFSFTIM0 is the IMS time services module. D22FTIM0 replaces DFSFTIM0 during the dynamic time change process. Once D22FTIM0 is loaded into CSA, IMSINIT establishes a recovery environment using the IMSESTAE submodule (Block 4060). The IMSESTAE submodule is only invoked by the MVS Recovery Termination Manager (RTM) if an ABEND occurs. Once the environment is established, IMSINIT saves the initial IMS time field (SCDCKVAL) in the IMSPARM area (Block 4070). The IMSPARM area is a work area used by the FALLBACK module. The SCD work field used by D22FTIM0 is initialized (Block 4080), and the IMS DFSFTIM0 address is saved in the IMSPARM area (Block 4090). The address of the DFSFTIM0 in the SCDTIMEP field is replaced with the address of D22FTIM0 (Block 4100). This allows IMS or IMS applications to use D22FTIM0 instead of DFSFTIM0 until the final processing is completed. When SCDTIMEP is replaced with the address of D22FTIM0, IMSINIT returns to the FALLBACK module (FIG. 3b, Block 1030) to begin the dynamic time change process.

Having completed the processing in the IMSINIT submodule, the FALLBACK module (FIG. 3b) checks to see if the MTQE is equal to the target time zone value setup in Block 1005 (Block 1030). If the target time zone value has been reached, FALLBACK calls the IMSTERM submodule (Block 1040) to perform the IMS termination function.

Figure 3B:
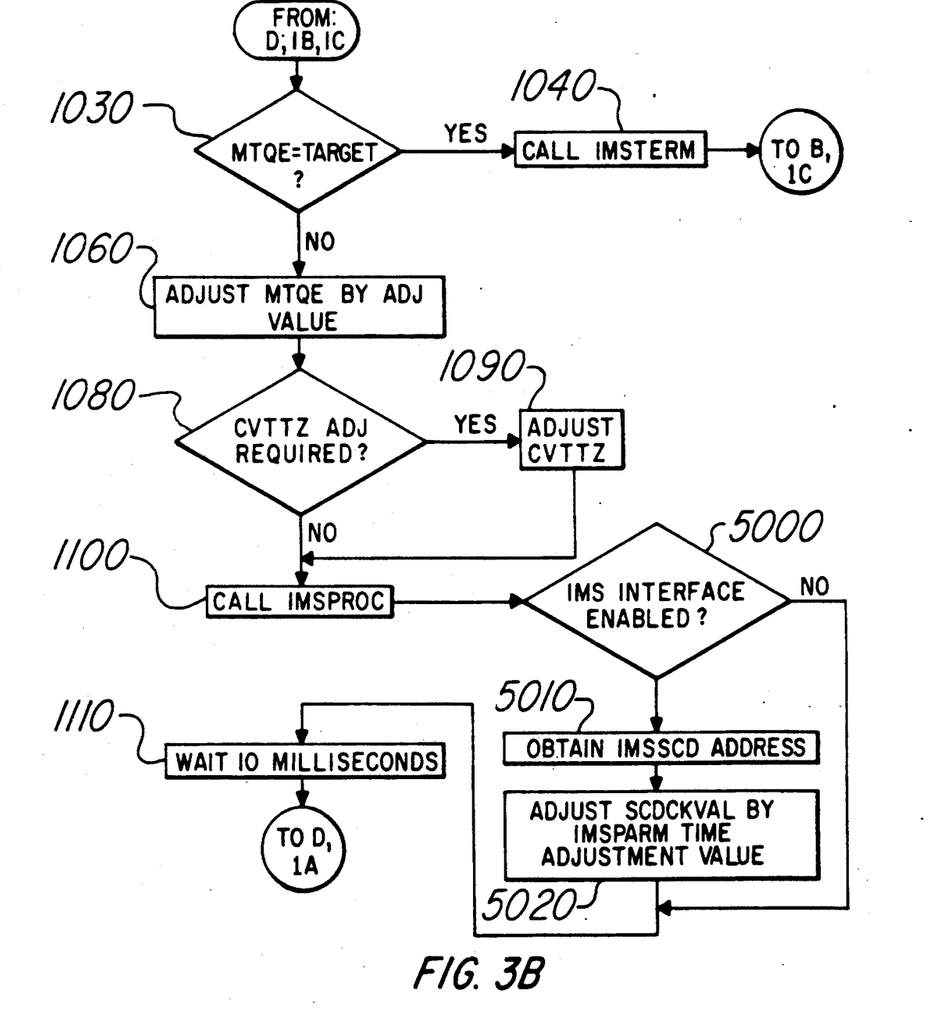
Figure 3C:
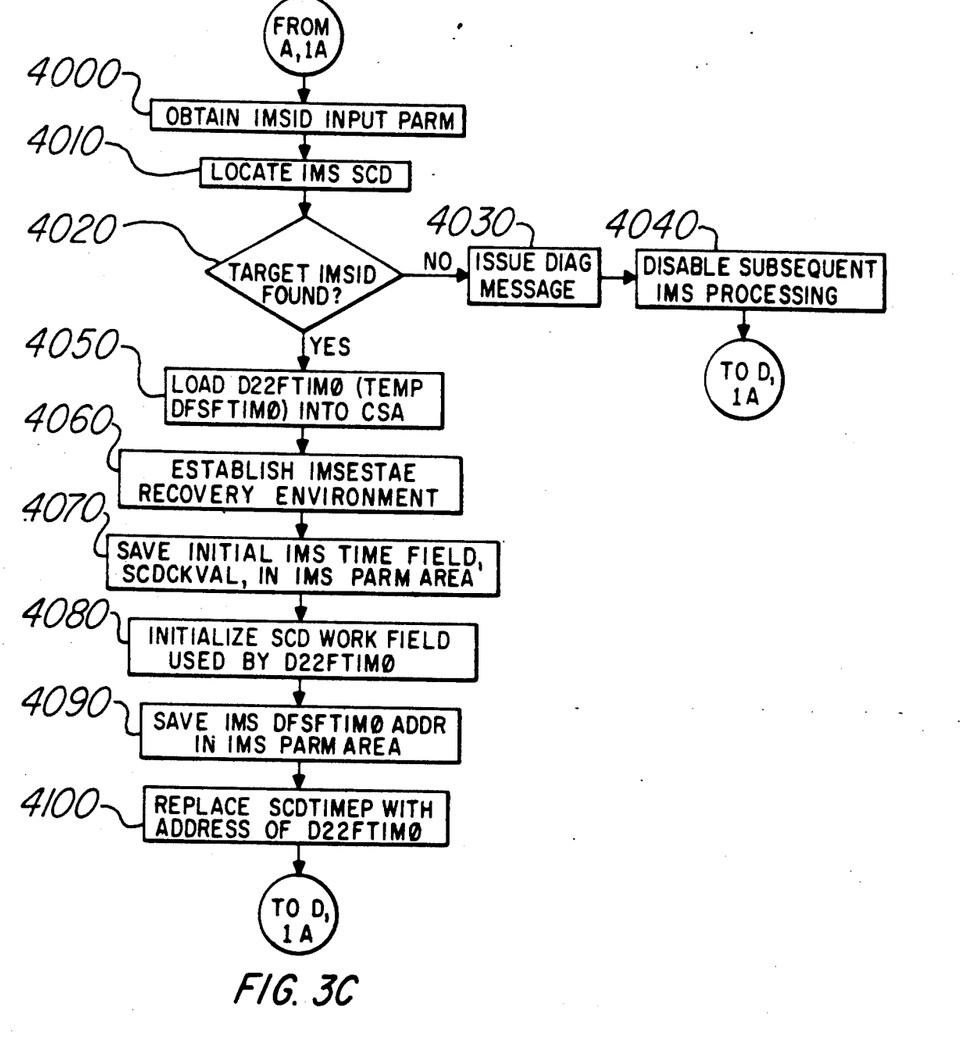

If the target time zone value has not been reached, the MTQE is adjusted by the time adjustment value (varying value with respect to equipment, in milliseconds)(Block 1060). With this small adjustment made, FALLBACK checks to see if there is a CVT time zone (CVTTZ) adjustment required. CVTTZ is the offset from Greenwich Mean Time (GMT) to local time. If required, the adjustment is performed (Block 1090) and FALLBACK calls the IMSPROC submodule (Block 1100). If not required, FALLBACK proceeds immediately to call the IMSPROC submodule (Block 1100).

After FALLBACK performs an update of the MVS time-related control blocks, it calls the IMSPROC (FIG. 3b, Blocks 5000-5020) submodule so it can perform an update of the IMS time-related storage. IMSPROC first checks to see if IMS processing has been enabled by IMSINIT (Block 5000). If not, IMSPROC returns to the FALLBACK module (FIG. 3a, Block 1010) and FALLBACK waits ten milliseconds. If the IMSID was found, IMSPROC obtains the IMS SCD address (FIG. 3b, Block 5010) and adjusts SCDCKVAL (which is the IMS equivalent of the MVS's TQE) by the time adjustment value in IMSPARM (Block 5020). This adjustment made, IMSPROC returns to the FALLBACK module, waits 10 milliseconds (FIG. 3a, Block 1010), and then checks (FIG. 3b, Block 1030) to see if the target MTQE has been reached.

Figure 3D:
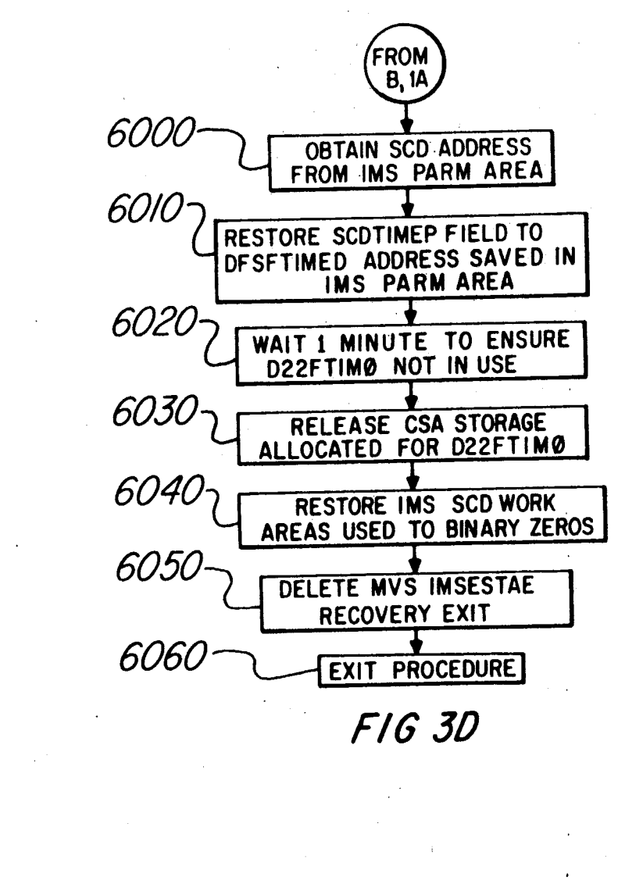

The IMSTERM submodule (FIG. 3d, Blocks 6000-6050) performs the necessary termination steps required by the software that modifies the IMS time-related storage areas. Invoked by FALLBACK when the MTQE target value is reached, IMSTERM first obtains the SCD address stored in the IMSPARM area for the SCDTIMEP field. Using the value at this address, IMSTERM restores the SCDITMEP field to the original value saved in IMSPARM for DFSFTIM0 (Block 6010). After waiting one minute to ensure D22FTIM0 is not in use (Block 6020), IMSTERM releases the CSA storage area allocated for D22FTIM0 (block 6030), sets IMS SCD fields used as work areas to binary zeros (Block 6040), and the MVS recovery exit is deleted (Block 6050). When this is completed, the IMSTERM submodule returns to the FALLBACK module (FIG. 3b, Block 1050) and exits the FALLBACK module.

Figure 4:
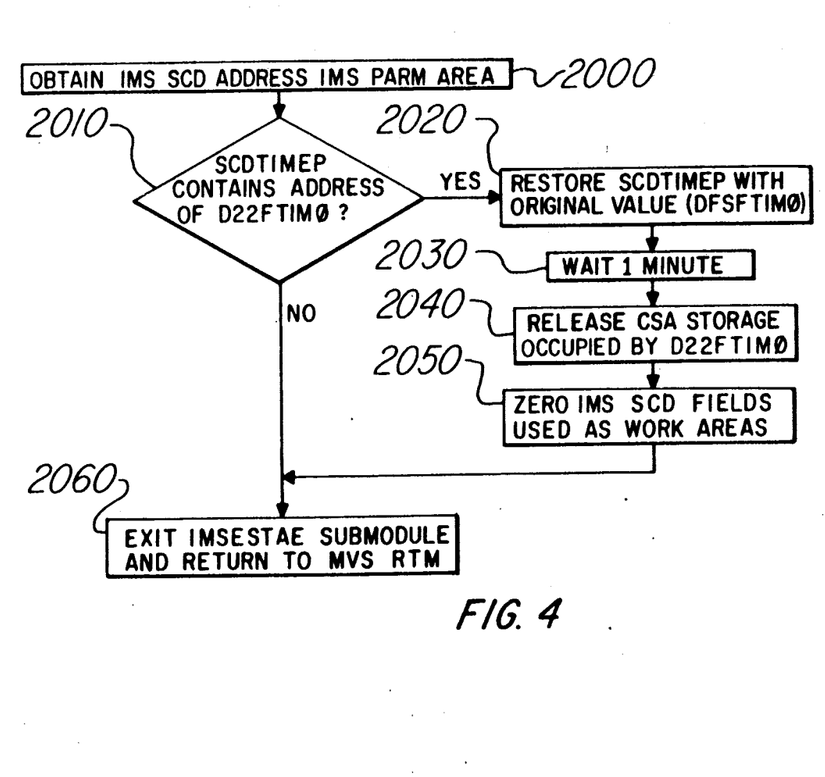
FIG. 4 is a process flow chart depicting a recovery aspect of the system and method for dynamic time change according to a preferred embodiment of the present invention.

The IMSESTAE submodule (FIG. 4, Blocks 2000-2060) provides recovery for the FALLBACK submodules that update IMS related fields providing time services to IMS internal software. This module is only invoked by the MVS Recovery Termination Manager (RTM) when an ABEND occurs. IMSESTAE begins by obtaining the IMS SCD address from the IMSPARM area (Block 2000). The SCDTIMEP field in the SCD is checked to see if it contains the address of D22FTIM0 (Block 2010). If it does, the SCDTIMEP field is restored to its original value (DFSFTIM0) (Block 2020), waits one minute (Block 2030), and then releases the CSA storage area occupied by D22FTIM0 (Block 2040). The IMS SCD fields used as work areas are set to binary zeros (Block 2050), and the IMSESTAE submodule is exited, and control returned to the MVS RTM (Block 2060). If SCDTIMEP does not contain the address of D22FTIM0, control is returned to the MVS RTM (Block 2060).

As has been shown, the present invention keeps computer systems up-to-date and operating around the clock, while allowing customer-required updates to be installed without incurring a computer system down time or any loss of application processing. Although the above-described embodiment operates in milliseconds, and most applications and computer operations transpire in milliseconds, some major subsystems and applications running on those subsystems may require only microseconds. As a result, it is possible for a job to have an ending time which is earlier than its supposed start time. To avoid this result, a modification is made to the operating system. Thus, as will be seen, the present invention ensures jobs being processed do not complete with an "end" time that is earlier than their respective "start" time.

Figure 5:
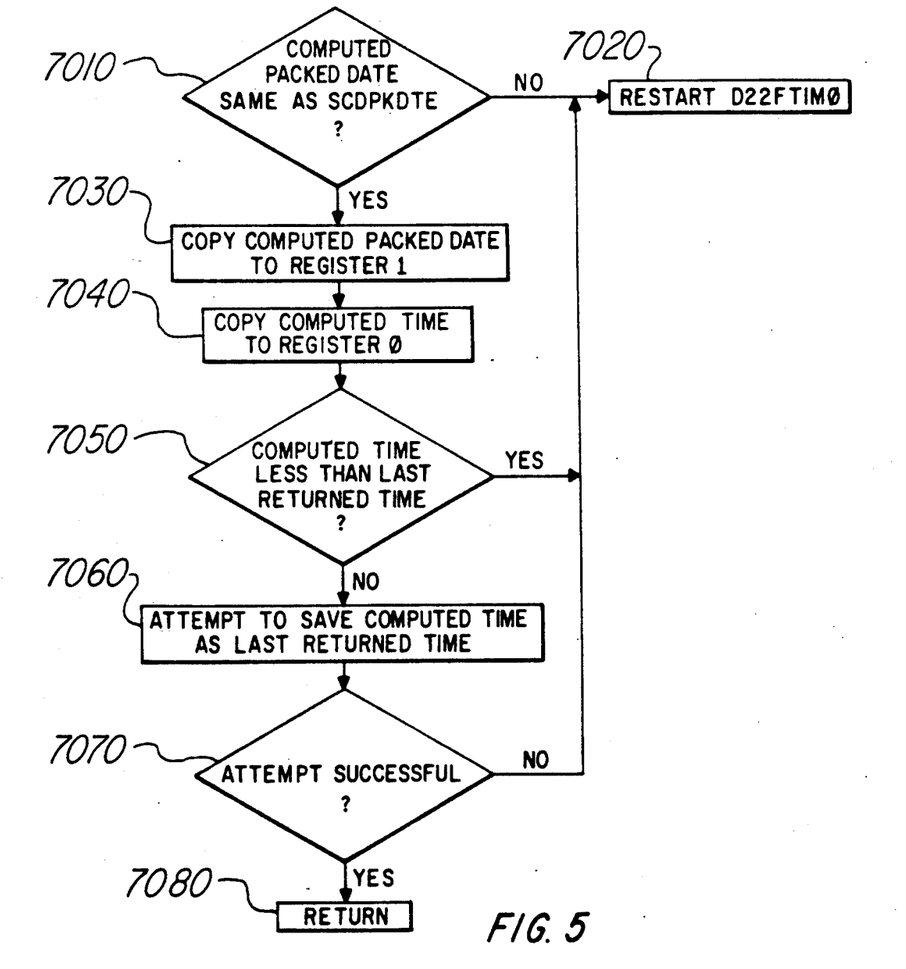
FIG. 5 is a process flow chart demonstrating the operation of a temporary version of a time module created according to the present invention.

FIG. 5 shows the modification made to the DFSFTIM0 module and used by the preferred embodiment of the dynamic time change system and method of the present invention. Basically, a temporary version of the IMS time module DFSFTIM0 is created. Such version is called D22FTIM0 and is used by the preferred embodiment of the present invention. It replaces the real DFSFTIM0 module for the duration of the execution of the dynamic time change system and method according to the present invention. After the current date and time have been calculated, a check is made to see if the date has changed (Block 7010). If the date has changed, the program returns to the beginning of the D22FTIM0 module and the time calculation is repeated (Block 7020).

If the date is not changed, the program copies the computed packed date into Register 1 (Block 7030), and the computed time into Register 0 (Block 7040). The computed time is checked to see if it is less than the last returned time (Block 7050). If it is, the program returns to the beginning of the D22FTIM0 module and the time calculation is repeated (Block 7020). If it is not less than the last returned time, the program attempts to save the computed time as the last returned time (Block 7060). The program checks to see if the attempt is successful (Block 7070); and if not, returns to the beginning of the D22FTIM0 module and the time calculation is repeated (Block 7020). If the attempt was successful, the program returns to the invoker.

An advantage of the system and method of the present invention is continuous application availability. During the seasonal time change, all applications continue to function. As noted earlier, this is critical in manufacturing environments where continuous operations is important to business success.

It should be understood that various embodiments of the invention can employ or be embodied in hardware, software or microcoded firmware. Process diagrams are also representative of flow diagrams for microcoded and software based embodiments.

While a specific embodiment of the invention has been shown and described, various modifications and alternate embodiments will occur to those skilled in the art. Accordingly, it is intended that the invention be limited only in terms of the appended claims.

We claim:

1. A system to dynamically change a computer system's time services control blocks to coincide with seasonal time-of-day changes, comprising:
   a first module for modifying said time services control blocks of said computer such that application programs executing in said computer system will still perceive ascending time-of-day values to internal requests for time of day; and
   a second module connected to said first module for transferring of control of said time services control blocks between said computer and said first module.

2. The system of claim 1, wherein said first module further comprises:
   a submodule for storing a time-of-day interpreter while its offset is being modified; and
   a submodule for creating a temporary version of said time-of-day interpreter to be used for said internal requests for time of day.

3. The system of claim 1, wherein said first module further comprises:
   a submodule for performing any necessary initialization prior to modifying said time services control blocks; and
   a submodule for performing any necessary termination procedures after completion of such modification to said time services control blocks.

4. A system for dynamically changing a central processing unit time-of-day clock, without interrupting applications executing concurrently and without incurring any system down time, comprising:
   a central processing unit time-of-day clock;
   a time offset;
   a provider of time services which determines a time value to be provided to an application based upon time values obtained from said time-of-day clock and said time offset; and
   a dynamic time changer which modifies said time value of said time offset, to thereby affect said time value to be provided to said application.

5. The system of claim 4, wherein said provider of time services obtains values from and stores values to a last-time-returned-to-application storage.

6. The system of claim 4, wherein, while said dynamic time changer is operating, said provider of time services is a temporary version of a permanent provider of time services, which normally maintains the same relationship as said temporary provider of time services.

7. The system of claim 6, wherein said temporary provider of time services or said permanent provider of time services obtain values from and stores values to a last-time-returned-to-application storage, depending upon which provider of time services is on-line.

8. The system of claim 4, wherein said dynamic time changer modifies said time value of said time offset by a predetermined value at a predetermined rate.

9. A method for dynamically changing the computer time of day to coincide with seasonal time of day changes, comprising the steps of:
   transferring control of a time-of-day interpreter employing an offset from a computer operation to a module;
   modifying said offset of said interpreter by a predetermined value at a predetermined rate until said offset reaches its synchronization value; and
   returning control of said interpreter to said computer operations.

10. The method of claim 9, further comprising the steps of storing said time-of-day interpreter while its offset is being modified; and
    creating a temporary version of said time-of-day interpreter to be used by said computer operations.

11. The method of claim 9, further comprising the steps of invoking a first submodule of said module to perform any necessary initialization prior to said step of modifying; and
    invoking a second submodule of said module to perform any necessary termination procedures after said step of modifying.

12. A method for dynamically changing a central processing unit time-of-day clock, without interrupting applications executing concurrently and without incurring any system down time, comprising the steps of:
    storing a last time value returned to an application in a storage;
    initializing a temporary time services block which determines time values to be returned to at least one application based on a time offset;
    said temporary time services block retrieving said stored last time value for use in determining said time values to be returned to said at least one application;
    modifying said time offset by a predetermined value at a predetermined rate;
    storing a last time value returned to an application in said storage; and
    terminating said temporary time services block.

13. The method of claim 12, wherein said temporary time services determines said time values to be returned to said at least one application based on values received from said central processing unit time-of-day clock, from said time offset, and from said last time value returned.

14. The method of claim 12, wherein said step of initializing a temporary time services block includes the step of storing a permanent time services block until said step of modifying is completed.

15. The method of claim 14, wherein said step of terminating said temporary time services block comprises the further steps of:

restoring said permanent time services block to control; and said permanent time services retrieving said last time stored in said storage to thereby determine a new time value to return to said at least one application.

* * * * *